(12) United States Patent
Kida

(10) Patent No.: US 6,279,965 B1
(45) Date of Patent: Aug. 28, 2001

(54) PIPE JOINT

(75) Inventor: Hidetomo Kida, Toyonaka (JP)

(73) Assignee: Kokusan Parts Industry Co., Ltd., Osaka (JP)

(*) Notice: Subject to any disclaimer, the term of this patent is extended or adjusted under 35 U.S.C. 154(b) by 0 days.

(21) Appl. No.: 09/546,336

(22) Filed: Apr. 10, 2000

(30) Foreign Application Priority Data

Apr. 12, 1999 (JP) .................................................. 11-103720

(51) Int. Cl.$^7$ .............................. F16L 23/00; F16L 23/16
(52) U.S. Cl. .................... 285/268; 285/47; 285/334.4; 285/271
(58) Field of Search ...................... 285/47, 268, 334.4, 285/271, 223, 231, 233

(56) References Cited

U.S. PATENT DOCUMENTS

| | | | |
|---|---|---|---|
| 937,533 | * 10/1909 | Kelly et al. | 285/271 |
| 1,140,508 | * 5/1915 | Forth | 285/271 |
| 1,726,483 | * 8/1929 | Giesler | 285/334.4 |
| 2,646,996 | * 7/1953 | Parmesan | 285/334.4 |
| 2,767,564 | * 10/1956 | Green | 285/334.4 |
| 2,864,630 | * 12/1958 | Breitenstein | 285/271 |
| 3,047,315 | * 7/1962 | Kinnison | 285/271 |
| 4,540,205 | * 9/1985 | Watanabe et al. | 285/334.4 |
| 5,374,086 | * 12/1994 | Higgins | 285/49 |
| 5,393,108 | * 2/1995 | Kerr | 285/271 |

FOREIGN PATENT DOCUMENTS

| | | | |
|---|---|---|---|
| 2360028 | * 2/1978 | (FR) | 285/334.4 |
| 394145 | * 6/1933 | (GB) | 285/271 |
| 863390 | * 5/1961 | (GB) | 285/334.4 |
| 59-127812 | 8/1984 | (JP) . | |
| 405231575 | * 9/1993 | (JP) | 285/49 |
| 4-619575 | * 5/1994 | (JP) | 285/49 |

* cited by examiner

Primary Examiner—Eric K. Nicholson
(74) Attorney, Agent, or Firm—Armstrong, Westerman, Hattori, McLeland & Naughton

(57) ABSTRACT

A pipe joint is provided whereby fluid pipelines, such as exhaust pipes, or the like, can be connected hermetically, in such a manner that the relative angle therebetween can vary, while ensuring satisfactory manufacturing precision of the sealing surface of a ring-shaped sealing ring. In a pipe joint 1 for connecting a first fluid pipeline 2 and a second fluid pipeline 3 hermetically, in such a manner that the relative angle therebetween can vary, a ring-shaped sealing ring 4 comprising an inner circumference sealing surface 4b having a tapered shape expanding in diameter towards the open end thereof is provided in the connecting section of the first fluid pipeline 2, an outer circumference sealing seat 3a having a partially convex surface is provided in the connecting section of the second fluid pipeline 3, in a position confronting said ring-shaped sealing ring 4, and pressure connecting means 5 for causing the inner circumference sealing surface 4b of the ring-shaped sealing ring 4 and said outer circumference sealing seat 3a to contact under pressure, in a slidable fashion, is provided in a region extending across both said fluid pipelines.

7 Claims, 6 Drawing Sheets

PIPE JOINT

BACKGROUND OF THE INVENTION

1. Field of the Invention

The present invention relates to a pipe joint for hermetically connecting fluid pipelines, in such a manner that the relative angle therebetween can vary, by means of a ring-shaped sealing ring.

2. Description of the Related Art

Conventionally, exhaust systems for automotive vehicle have been devised in such a manner that the connection between the combining pipe of the exhaust manifold and an exhaust pipe, and connections between exhaust pipe and exhaust pipe, are capable of variation in the relative angle between pipes by means of a pipe joint having the composition described below, in order to suppress relative movement between the vehicle and engine, or the like, occurring due to vibration of the engine or vibrations from the road surface whilst the vehicle is moving.

For example, in a widely used composition such as the pipe joint 50 illustrated in FIG. 6, a tapered sealing seat 52b is formed on the inner circumference of an integrated flange 52 formed on the downstream end portion of the combining pipe 51 of an exhaust manifold provided in the engine of an automotive vehicle, and furthermore, a ring-shaped sealing ring 54 having a convex surface 54a corresponding to the aforementioned sealing seat 52b is installed on the outer circumference of the connecting end portion 56 of an exhaust pipe 53 connected to the aforementioned exhaust manifold 51 [sic], the aforementioned tapered sealing seat 52b and the aforementioned convex surface 54a being capable of hermetic sliding motion such that the relative angle therebetween can vary, under pressure applied by pressure connecting means 55 provided in the coupling region between the two pipelines.

Moreover, with regard to pipe joints for connecting together two exhaust pipes in an automotive vehicle, the spherical pipe joint disclosed in Japanese Patent Publication No.(Hei)2-33912 is known, for example. This joint is composed in such a manner that a ring-shaped sealing ring having a convex surface is installed on the outer circumference of the end portion of an upstream-side exhaust pipe, and a flange having a concave-shaped sealing seat corresponding to the aforementioned convex surface formed therein is fixed by welding to the connecting end portion of a downstream-side exhaust pipe, the convex surface of the aforementioned ring-shaped sealing ring and the concave surface of the aforementioned sealing seat being capable of hermetic sliding motion such that the relative angle therebetween can vary, under pressure applied by pressure connecting means provided in the coupling region between the two exhaust pipes.

The ring-shaped sealing rings used in conventional pipe joints of these kinds are generally obtained by overlaying a fire-resistant material in sheet form, such as expanded graphite or mica, for example, with fine metal wire made from stainless steel, or the like, winding and laminating same, and then applying strong pressure to the laminate surface from a perpendicular direction in a metal mould of a prescribed shape, thereby forming a truncated spherical shape having a cylindrical hole in the centre thereof. However, since the aforementioned fine metal wire has high elasticity, it has been difficult to ensure adequate precision in the moulding of the concave surface formed in the ring-shaped sealing rings.

Moreover, in order to ensure good sealing properties between the ring-shaped sealing ring and the outer circumference of the connecting end section, thereby preventing any leakage of exhaust, the ring-shaped sealing ring installed on the outer side of the aforementioned connecting end section is held under strong pressure by means of a fastening spring, and consequently the related installation task is complicated and leads to an increase in costs.

SUMMARY OF THE INVENTION

With the foregoing in view, it is an object of the present invention to provide a pipe joint whereby fluid pipelines, such as exhaust pipes, or the like, can be connected hermetically in such a manner that the relative angle therebetween can vary, whilst ensuring satisfactory manufacturing precision in the sealing surface of a ring-shaped sealing ring.

In order to achieve the aforementioned object, the present invention is a pipe joint for connecting a first fluid pipeline and a second fluid pipeline hermetically, in such a manner that the relative angle therebetween can vary; wherein a ring-shaped sealing ring comprising an inner circumference sealing surface having a tapered shape expanding in diameter towards an open end thereof is provided in the connecting section of the first fluid pipeline; an outer circumference sealing seat having a partially convex surface is provided in the connecting section of the second fluid pipeline, in a position confronting the ring-shaped sealing ring; and pressure connecting means for causing the inner circumference sealing surface of the ring-shaped sealing ring and the outer circumference sealing seat to contact under pressure, in a slidable fashion, is provided in a region extending across both the fluid pipelines.

In a pipe joint of this kind, the aforementioned tapered inner circumference sealing surface of the ring-shaped sealing ring provided in the connecting section of the first fluid pipeline and the partially convex outer circumference sealing seat provided in the connecting section of the second fluid pipeline are able to slide respectively, whilst in a state of pressure contact, and if a vibration acts on the fluid pipelines, due to engine vibration or another cause, this vibration is absorbed whilst maintaining a hermetically sealed state, by means of smooth variation in the relative angle between the two fluid pipelines. Moreover, a conical tapered inner circumference sealing surface, which is more easily formable than a convex surface, is provided in the ring-shaped sealing ring held in pressure contact with the partially convex outer circumference sealing seat, and hence the ease of manufacturing the ring-shaped sealing ring is improved dramatically and satisfactory manufacturing precision can be ensured.

Here, in a pipe joint, wherein the outer circumference surface of the ring-shaped sealing ring is formed with a tapered shape expanding in diameter towards the open end of the first fluid pipeline, the ring-shaped sealing ring being installed inside an inner circumference groove formed in the connecting section of the first fluid pipeline, the sealing ring can be installed readily by sliding into the tapered inner circumference groove, and moreover, the ranges of tolerance for the dimensions of both the ring-shaped sealing rings and the fluid pipes can be broadened compared to a conventional system where a ring-shaped sealing ring is held under pressure on the outer circumference of a pipe end section by means of a fastening spring, and satisfactory sealing properties can be ensured in the interlocking section between the ring-shaped sealing ring and the first fluid pipeline, when the sealing ring is installed.

In a pipe joint, wherein the outer circumference sealing seat having a partially convex surface is formed by causing the open end section of a second cylindrical fluid pipeline to expand by means of pressure deformation, the smooth surface properties of the fluid pipeline can be used directly for the surface of the outer circumference sealing seat, the sealing properties between the sealing seat and the aforementioned ring-shaped sealing ring can be stabilized readily to the required level, and sealing faults caused by tool marks on the component surfaces which arise inevitably during machine processing steps, such as cutting, grinding, and the like, can be prevented completely.

Preferably, the aforementioned first fluid pipeline or second fluid pipeline are, respectively, an exhaust manifold combining pipe or an exhaust pipe constituting the exhaust system of an internal combustion engine, a material having thermal resistance, wear resistance and corrosion resistance being used for the aforementioned ring-shaped sealing ring.

DESCRIPTION OF THE PREFERRED EMBODIMENTS

Figure 1:
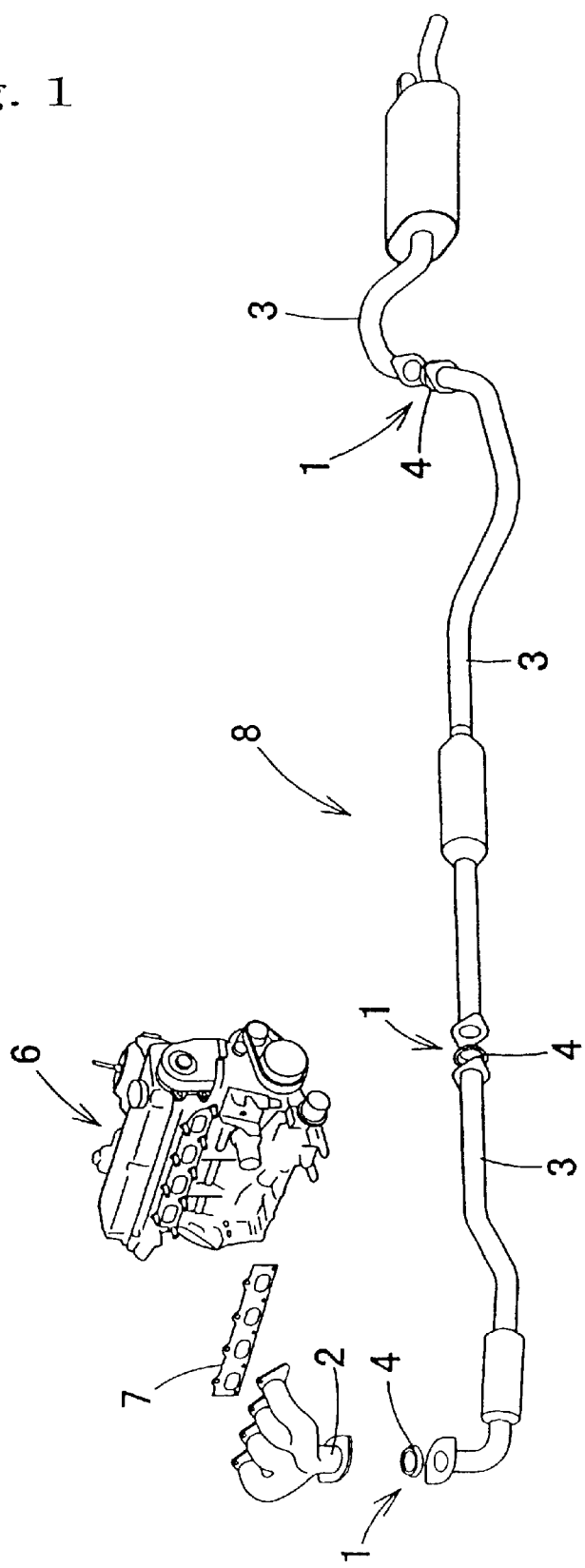
FIG. 1 is a general oblique view showing a state where pipe joints according to the present invention are used in an automotive vehicle exhaust system.
Figure 2:
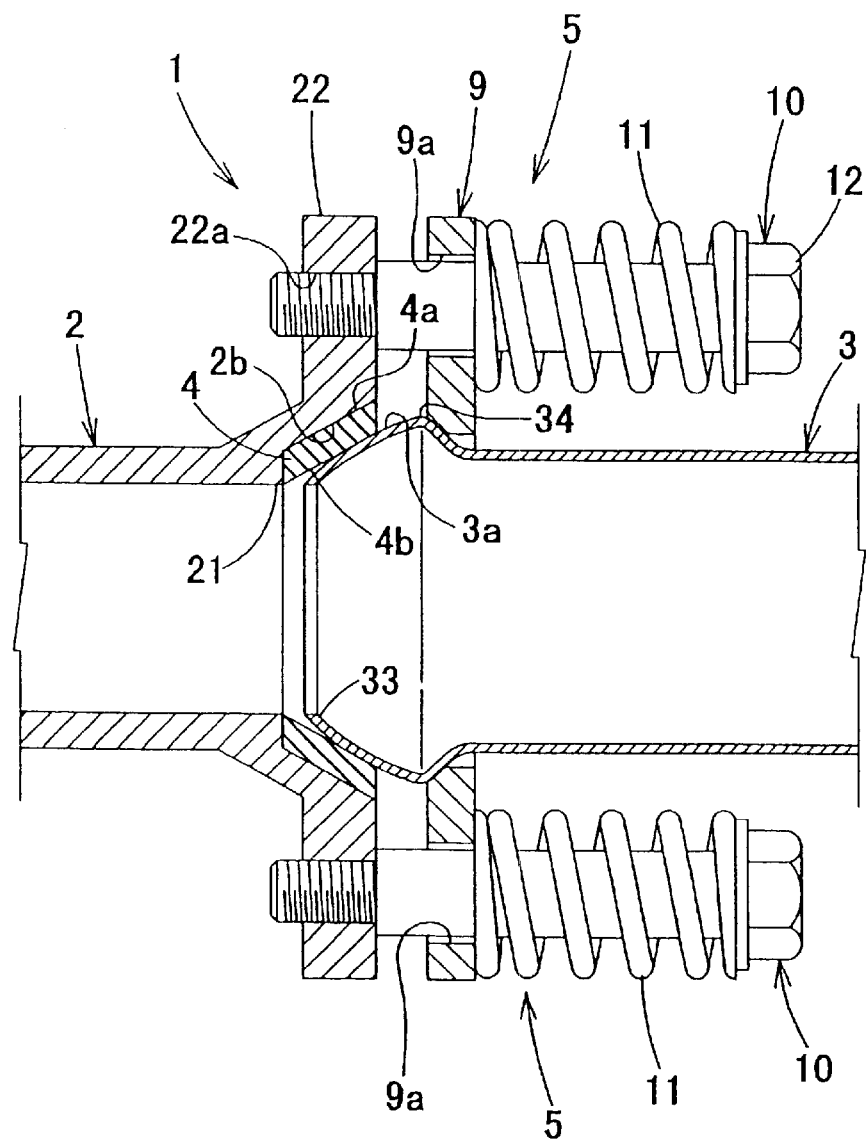
FIG. 2 is a sectional diagram illustrating a first embodiment of the present invention.
Figure 3:
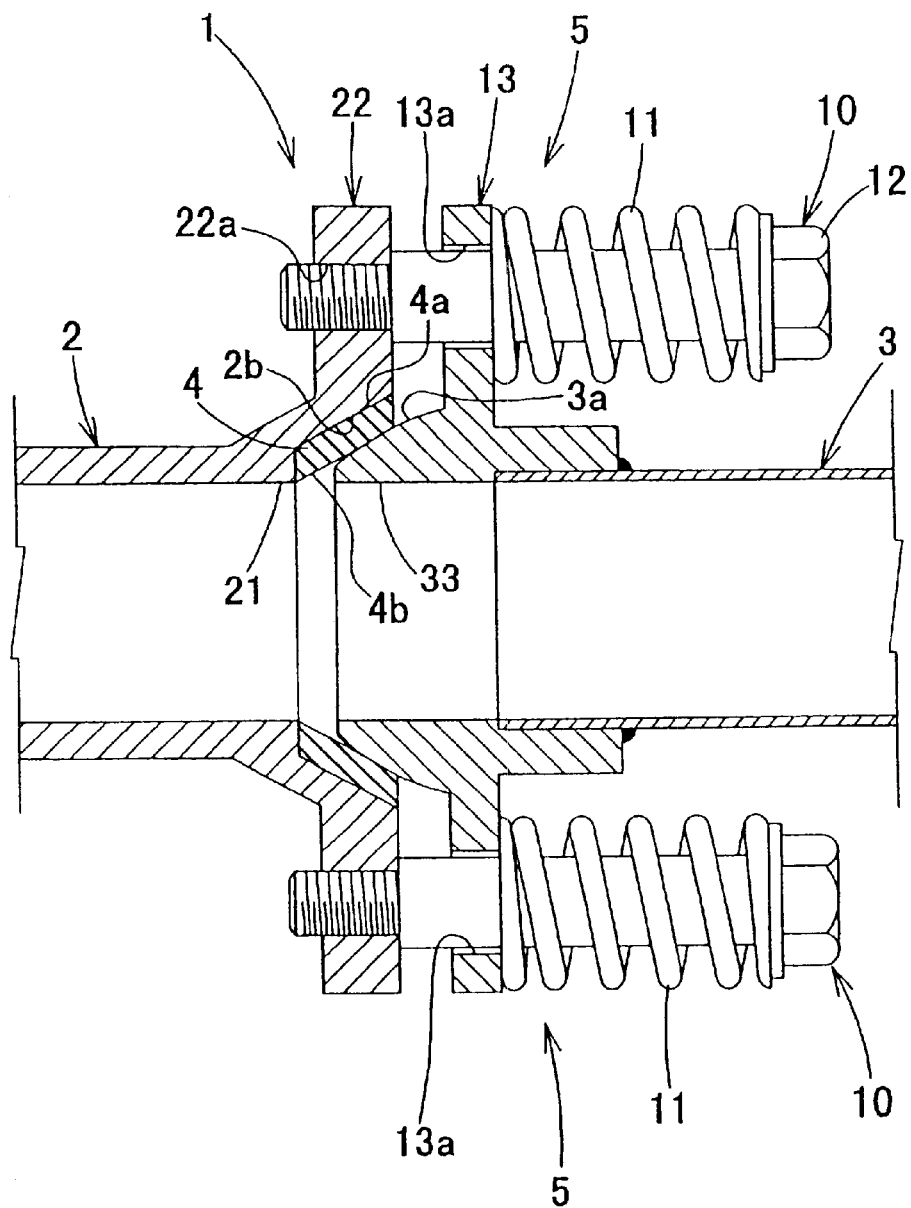
FIG. 3 is a sectional diagram illustrating a second embodiment of the present invention.
Figure 4:
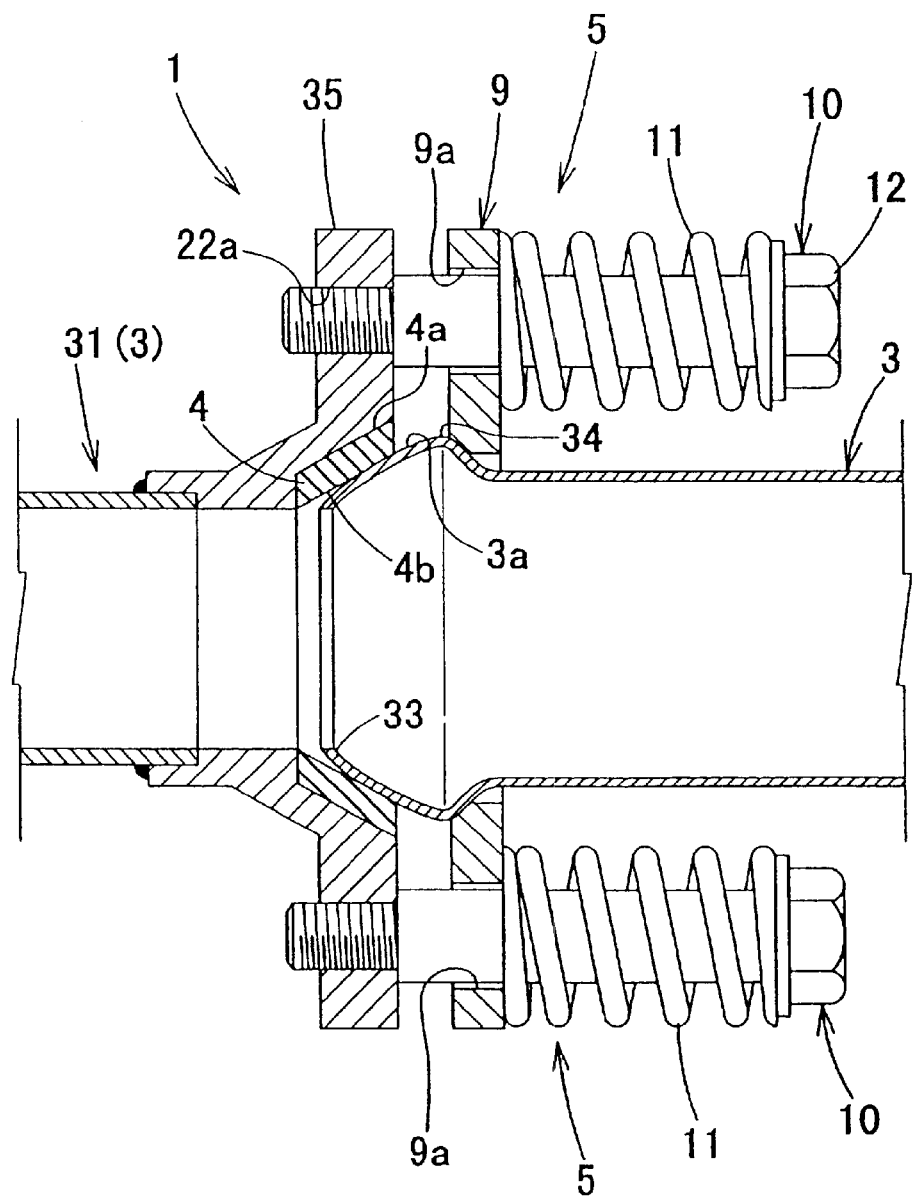
FIG. 4 is a sectional diagram illustrating a third embodiment of the present invention.
Figure 5:
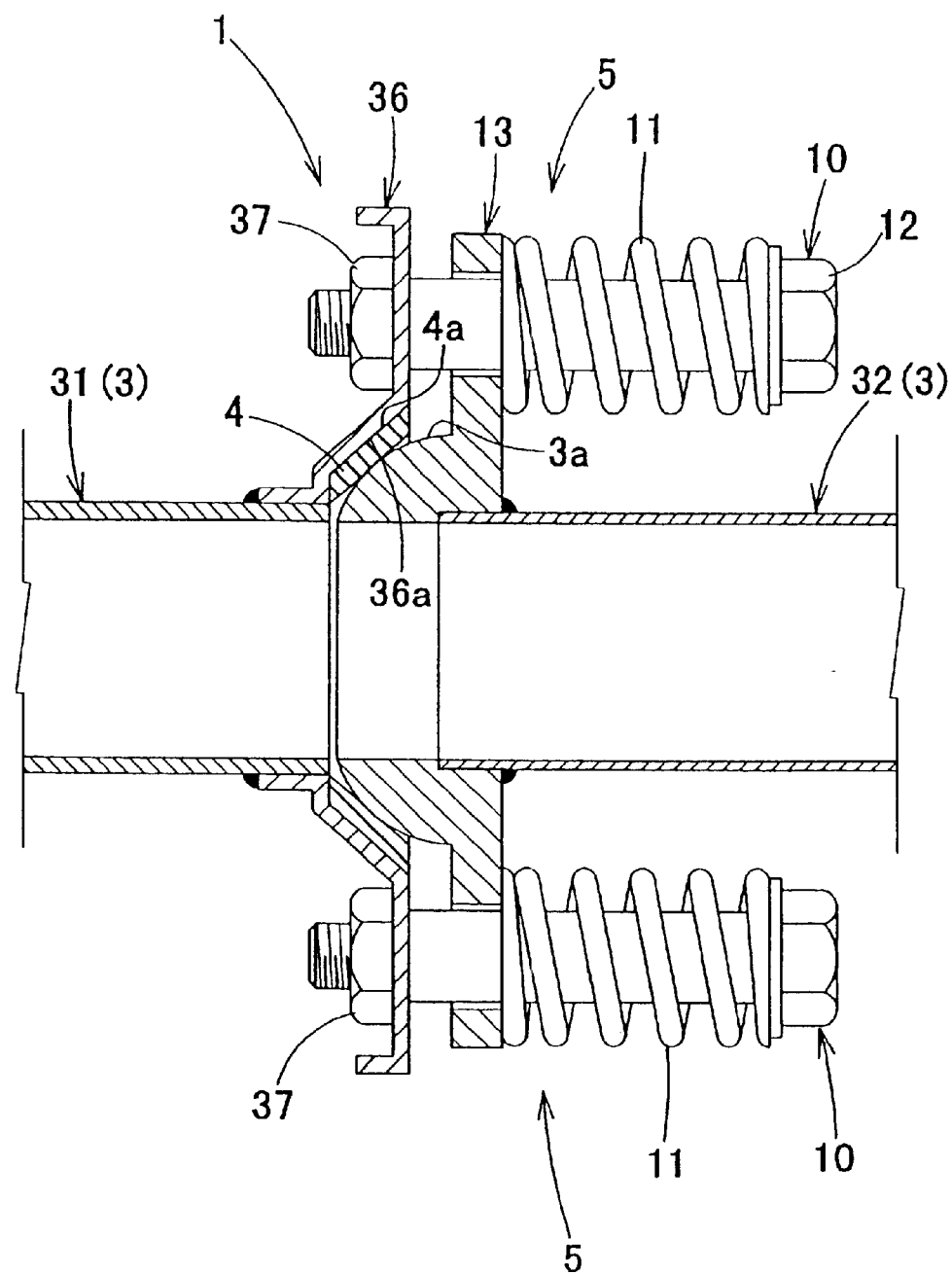
FIG. 5 is a sectional diagram illustrating a fourth embodiment of the present invention.
Figure 6:
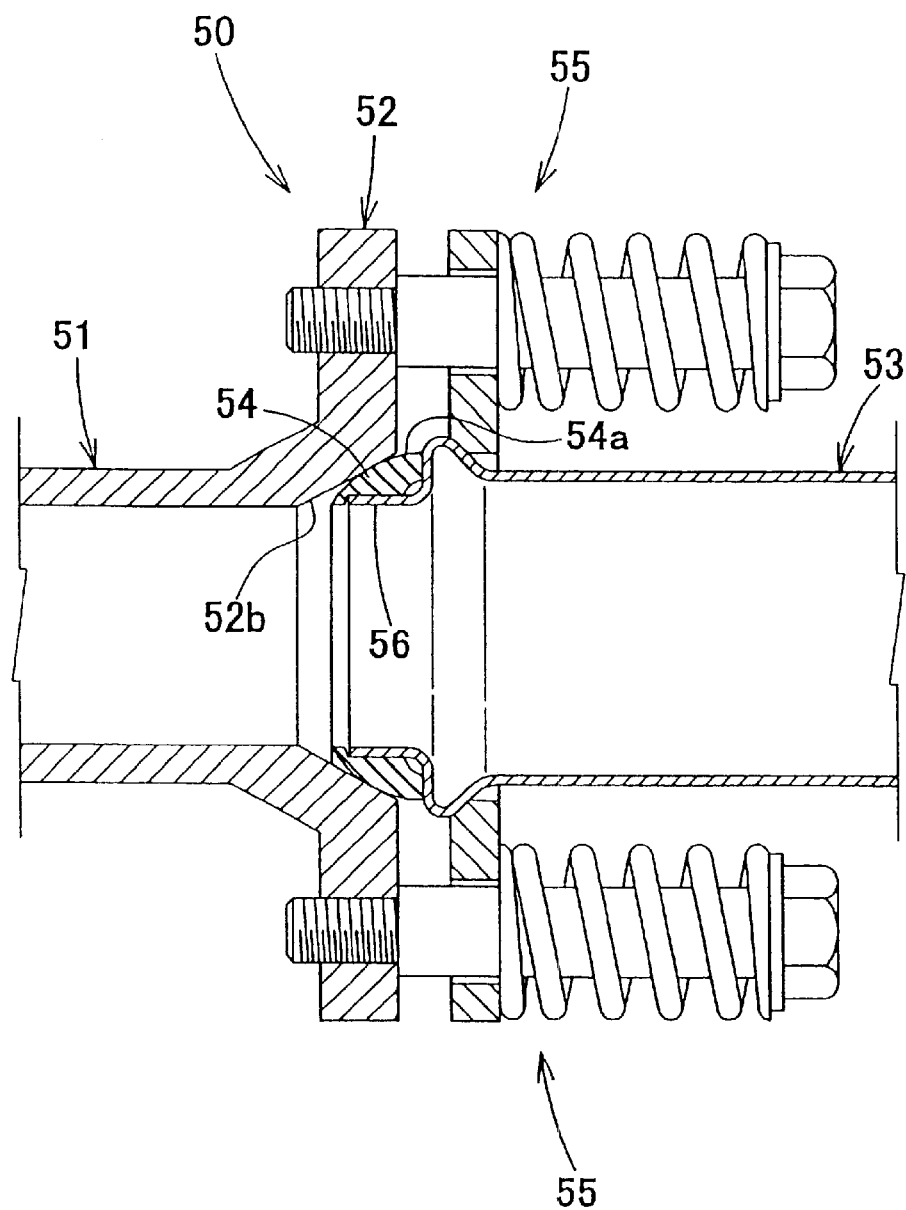
FIG. 6 is a sectional diagram illustrating a conventional pipe joint.

Next, embodiments of the present invention are described in detail with reference to the accompanying drawings. FIG. 1 shows a practical example wherein the pipe joint according to the present invention is used to connect an exhaust manifold combining pipe with an exhaust pipe coupling to same, and to connect the exhaust pipe with a further exhaust pipe, in the exhaust system of an automotive vehicle. FIG. 1 and FIG. 2 show a first embodiment of the pipe joint relating to the present invention; FIG. 3 shows a second embodiment; FIG. 4 shows a third embodiment; and FIG. 5 shows a fourth embodiment. In the drawings, numeral 1 is a pipe joint, 2 is an exhaust manifold combining pipe, 3 is an exhaust pipe, and 4 is a ring-shaped sealing ring.

As illustrated in FIG. 1, the exhaust system of an automotive vehicle engine comprises, in order from the upstream side, an exhaust manifold which is connected via a gasket 7 to the cylinder head of the engine 6, and a combining pipe 2 of the exhaust manifold, a plurality of exhaust pipes 3, a catalytic converter, and a muffler. The pipe joint according to the present invention can be applied suitably at a single point or a plurality of points as coupling means in an automotive vehicle exhaust system 8 of this kind. The pipe joint 1 reliably maintains a hermetically sealed state between connected fluid pipelines, by allowing the pipelines to slide smoothly with respect to each other in such a fashion that the relative angle therebetween can vary, and hence it absorbs vibrations acting on the whole of the aforementioned exhaust system 8, such as vibrations of the engine 6 itself, vibrations caused by the travel of the automotive vehicle, or the like, whilst preventing leakage of exhaust gas, and therefore avoids completely any adverse effects on in-vehicle quietness that this vibration might cause.

The ring-shaped sealing ring 4 (described later) which is used in a pipe joint 1 employed in an automotive vehicle exhaust system 8 of this kind is required to have not only pressure resistance properties, anti-corrosion properties, anti-wear properties, lubricating properties, and sealing properties, but also thermal resistance properties enabling it to withstand satisfactorily high temperatures in the range of 300–1000° C. However, the application of the pipe joint 1 according to the present invention is not limited to automotive vehicle exhaust systems, and it may be applied suitably to the exhaust systems of ships, motorcycles, trucks, industrial machinery, and other internal combustion and external combustion engines, besides which it may also be applied suitably as a connecting joint for piping in fluid transportation equipment, such as gas pipelines or water pipelines in areas of soft ground, where vibration absorbing properties are particularly required in addition to gas sealing and water sealing properties, or for piping in the exhaust systems of power plants of different types, or the like. The material and method of manufacturing the aforementioned ring-shaped sealing ring 4 can be selected appropriately according to the characteristics of the fluid passing along the respective pipeline.

FIG. 2 shows a pipe joint 1 relating to a first embodiment for connecting the combining pipe 2 of an exhaust manifold and an exhaust pipe 3 coupling to same in the exhaust system of an automotive vehicle as described above. The combining pipe 2 corresponds to the first fluid pipeline of the present invention and the exhaust pipe 3 corresponds to the second fluid pipeline.

Specifically, this pipe joint is a pipe joint 1 for hermetically connecting a combining pipe 2 forming an upstream-side fluid pipeline, and an exhaust pipe 3 forming a downstream-side fluid pipeline, in such a manner that the relative angle therebetween can vary, wherein a ring-shaped sealing ring 4 comprising an inner circumference sealing surface 4b having a partial conical tapered shape expanding in diameter towards the opening of the combining pipe 2 is provided on the inner circumference side of an open end section 21 constituting the connecting section of the aforementioned combining pipe 2, an outer circumference sealing seat 3a having a partial convex shape is provided on the outer circumference side of an open end section 33 constituting the connecting section of the exhaust pipe 3, in a position confronting the aforementioned ring-shaped sealing ring 4, and furthermore, pressure connecting means 5 for causing the inner circumference sealing surface 4b of the ring-shaped sealing ring 4 to connect under pressure with the aforementioned outer circumference sealing seat 3a, in a slidable manner, is provided in a region extending from the aforementioned combining pipe 2 to the exhaust pipe 3.

The outer circumference surface 4a of the ring-shaped sealing ring 4 is formed in a tapered shape expanding in diameter towards the open side of the combining pipe 2 and fits in a hermetically sealed state into an inner circumference groove 2b formed in the connecting section of the combining pipe 2.

Moreover, the outer circumference sealing seat 3a having a partial convex shape is formed by causing the open end section of a cylindrical exhaust pipe 3 to expand by pressure deformation.

Next, the composition of the various parts of the pipe joint 1 will be described in detail.

An integrated flange 22 projects in an outward radial direction from the outer circumference of the open end section 21 of the combining pipe 2, this flange 22 also comprising a plurality of screw holes 22a into which the screw sections on the tips of setting bolts 10 (described later) are screwed. Similarly, an inner circumference groove 2b as described above, which is cut away in a tapered shape, is formed on the inner circumference side of the open end section 21, the ring-shaped sealing ring 4 being simple to install therein, and the dimensions of the ring-shaped sealing ring 4 and the inner circumference groove 2b being formed with a wide range of tolerance. Furthermore, means for preventing turning of the ring-shaped sealing ring 4 (not illustrated) is also provided on the front surface of the aforementioned inner circumference groove 2b, and preferable embodiments of said means may involve, for example, providing interlocking projections and depressions in the outer circumference surface 4a of the ring-shaped sealing ring 4 and the surface of the inner circumference groove 2b, forming a rough surface generating a high force of friction in a portion thereof, whilst maintaining a hermetically sealed state with the outer circumference surface 4a, or the like.

As described above, the ring-shaped sealing ring 4 comprises an outer circumference surface 4a having a tapered shape corresponding to the inner circumference groove 2b of the combining pipe 2, and the inner circumference side thereof is formed with a tapered inner circumference sealing surface 4b, which is roughly parallel to the aforementioned tapered outer circumference surface 4a, expands in diameter towards the open side of the combining pipe 2, and receives the open end section 33 of the exhaust pipe 3.

In the present invention, the inner circumference groove 2b into which the ring-shaped sealing ring is installed is not limited to having a tapered shape, and any other appropriate shape may be adopted, for example, a ring-shaped sealing ring having an outer circumference surface parallel to the axis thereof may be inserted into and engaged with an inner circumference groove having an inner circumference surface which is similarly parallel to the axis. The same material and manufacturing method can be used for this ring-shaped sealing ring 4 as for a sealing ring having a partial convex surface, as used widely in conventional automotive vehicle exhaust systems, and preferably, it is manufactured by introducing or filling a viscous thermally resistant sheet, thermally resistant resin, ceramic powder, or the like, into a mesh member formed by weaving stainless steel wire in the shape of a bag, and then pressure forming same in the axial direction thereof together with an expanded graphite sheet, to produce a ring-shaped sealing ring having a conical tapered sealing surface on the inner circumference thereof and a similarly tapered outer circumference surface on the outer circumference thereof, whereupon a lubricating material, such as molybdenum disulphide, fluorine tetranitride, or the like, is applied to the surface of the sealing ring.

Since the sealing surfaces 4a, 4b of the ring-shaped sealing ring 4 relating to the present invention are tapered surfaces, they are easier to form and yield improved precision, compared to conventional sealing rings having convex surfaces.

An outer circumference sealing seat 3a having a partial convex shape which is expanded by pressure deformation is formed on the outer circumference of exhaust pipe open end section 33 which is received by the aforementioned inner circumference sealing surface 4b, and on the opposite side of the outer circumference sealing seat 3a to the aforementioned combining pipe 2, a loose flange 9 having a through hole of internal diameter smaller than the expanded section 34 containing the maximum external diameter of the aforementioned outer circumference sealing seat 3a is installed movably in an axial direction about the outer circumference of the aforementioned exhaust pipe 3, in such a manner that it is prevented from becoming detached from the open end section 33 by confronting the aforementioned expanded section 34, clearance holes 9a through which setting bolts 10 are inserted being formed in positions corresponding to the plurality of screw holes 22a formed in the aforementioned integrated flange 22.

Preferably, surface coating is applied to the outer circumference sealing seat 3a which slides against the inner circumference sealing surface 4b, in order to form an anti-corrosive lining layer of vinyl chloride resin, epoxy resin, or the like, or a lubricating layer of fluorine resin, or the like.

Pressure connecting means 5 is constituted by the loose flange 9 provided about the outer circumference of the exhaust pipe 3, setting bolts 10 which pass through the clearance holes 9a in the loose flange 9 and screw into the screw holes 22a in the flange 22, and coil springs 11 which are installed between the loose flange 9 and the bolt head sections 12 and press the loose flange 9 in the direction of the combining pipe 2, and by means of the exhaust pipe 3 being pressed relatively towards the combining pipe 2 via the expanded section 34 thereof, under the elastic force of the coil springs 11, the outer circumference sealing seat 3a is pressed hermetically against the inner circumference sealing surface 4b of the ring-shaped sealing ring 4, and moreover, the combining pipe 2 and the exhaust pipe 3 are connected in such a manner that the relative angle therebetween can vary. The pressure connecting means in the composition of the pipe joint according to the present invention is not limited to the composition described above, and other compositions thereof may be adopted appropriately, provided that they enable two fluid pipelines to be connected in such a fashion that the relative angle therebetween can vary.

FIG. 3 shows a second embodiment of the present invention. Similarly to the first embodiment described above, this embodiment illustrates a pipe joint 1 connecting a combining pipe 2 of an exhaust manifold with an exhaust pipe 3 in an automotive vehicle exhaust system, but in this embodiment, instead of the outer circumference sealing seat 3a being formed into an expanded shape by pressure deformation, as in the first embodiment, a flange member 13 comprising a partially convex outer circumference sealing seat 3a making tight contact with a ring-shaped sealing member is fixed to the open end section of the exhaust pipe 3. In this embodiment, the flange member 13 is fixed to the open end section of the exhaust pipe 3 by insertion welding, but it is also possible to use other suitable fixing methods, such as butt welding, screw welding, or the like, depending on the vibration, stress, and the like, acting on the joint.

The first embodiment and second embodiment described above related to a pipe joint 1 used to connect a combining pipe 2 of an exhaust manifold and an exhaust pipe 3 in the exhaust system of an automotive vehicle, but below, an embodiment is described wherein the pipe joint according to the present invention is similarly applied to a connection between two exhaust pipes in an automotive vehicle exhaust system. Furthermore, the structure of the pipe joint according to the present invention is not limited in any way by the flow direction of the fluid, and therefore in the embodiment described below, it does not matter which of the exhaust pipes is in the upstream position, and either of the exhaust pipes may be in the upstream position with respect to the exhaust gas.

FIG. 4 gives an illustration of the third embodiment of the present invention.

FIG. 4 depicts a pipe joint 1 for connecting, in a hermetically sealed state, one exhaust pipe through which exhaust gas from an engine is flowing (hereinafter, referred to as "first exhaust pipe" to simplify the description) 31, with a further exhaust pipe coupling to same (hereinafter, similarly referred to as "second exhaust pipe") 32, in such a manner that the relative angle therebetween can vary. The exhaust pipe 31 corresponds to the first fluid pipeline of the present invention and the exhaust pipe 32 corresponds to the second fluid pipeline.

Specifically, a ring-shaped sealing ring 4 having a tapered inner circumference sealing surface 4b expanding in diameter towards the open end thereof is provided on the inner circumference side of a flange member 35 forming a connecting section which is fixed externally to the end portion of a first exhaust pipe 31 by insertion welding, an outer circumference sealing seat 3a having a partial convex shape is formed by expansion through pressure deformation at the end portion of a second exhaust pipe forming a connecting section received by the ring-shaped sealing ring 4, in a position confronting the ring-shaped sealing ring 4, and moreover, pressure connecting means 5 for causing the inner circumference sealing surface 4b of the ring-shaped sealing ring 4 and the outer circumference sealing seat 3a to contact under pressure, in a slidable fashion, is provided in a region extending from the aforementioned first exhaust pipe 31 to the second exhaust pipe 32. The composition of each part is similar to the pipe joint 1 in the first embodiment described above, and similar parts are labeled with the same numerals and description thereof is omitted here.

Next, FIG. 5 illustrates a fourth embodiment of the present invention. Similarly to the third embodiment, this embodiment relates to a pipe joint for connecting a first exhaust pipe 31 and a second exhaust pipe 32. A flange member 36 fitted externally about the end portion of the first exhaust pipe 31 is constituted by a steel member of approximately similar thickness to the exhaust pipe, and setting bolts 10 constituting pressure connecting means 5 are fixed to the aforementioned flange member 36 by means of fastening nuts 37. Preferably, an engaging projection for engaging with the ring-shaped sealing ring 4 is provided on the inner circumference groove 36a of the flange member 36, thereby providing a function for preventing the ring-shaped sealing ring 4 from rotating.

According to the pipe joint of the present invention described above, even in cases where vibrations act upon fluid pipelines, these vibrations can be absorbed whilst maintaining a hermetically sealed state in a connecting section, by means of smooth variation in the relative angle between the fluid pipelines. Moreover, since a tapered inner circumference sealing surface which is more easily formable than a convex shape is formed on the ring-shaped sealing ring, the precision of the sealing surface can be guaranteed satisfactorily, thereby improving sealing properties.

In a pipe joint wherein the outer circumference surface of a ring-shaped sealing ring is formed in a tapered shape expanding in diameter towards the open end of a first fluid pipeline, the ring-shaped sealing ring being installed in an inner circumference groove formed in the connecting section of the first fluid pipeline, the ring-shaped sealing ring is simple to install, and moreover, the tolerance ranges for the dimensions of the ring-shaped sealing ring and fluid pipelines are broader than in conventional pipe joints where the sealing ring is held under pressure on the outer circumference of the pipe end section by means of a fastening spring. Furthermore, satisfactory sealing properties can be ensured in the interlocking region between the installed ring-shaped sealing ring and the first fluid pipeline.

In a pipe joint wherein a partially convex outer circumference sealing seat is formed by causing the open end portion of a second cylindrical fluid pipeline to expand by pressure deformation, it is possible to use the smooth surface properties of the fluid pipeline directly as the surface of the outer circumference sealing seat, thereby enabling sealing characteristics between the sealing surface of the ring-shaped sealing ring and the outer circumference sealing seat to be stabilized readily, without requiring machine processing steps, such as cutting, grinding, or the like, and hence making it possible to prevent the occurrence of any tool marks or sealing failures caused by same.

If the first fluid pipeline and the second fluid pipeline are, respectively, an exhaust manifold combining pipe or exhaust pipe constituting an exhaust system for an internal combustion engine, and if a material having thermal resistance, anti-wear properties, and anti-corrosive properties is used for the ring-shaped sealing ring, then it is possible to prevent wear of the connecting section due to the vibration of the internal combustion engine, and hence durability and noise characteristics can be improved.

DESCRIPTION OF THE SYMBOLS 1 pipe joint
2 combining pipe
2b inner circumference groove
3 exhaust pipe
3a outer circumference sealing seat
4 ring-shaped sealing ring
4a outer circumference surface
4b inner circumference surface
5 pressure connecting means
6 engine
7 gasket
8 exhaust system
9 loose flange
9a clearance hole
10 setting bolt
11 coil spring
12 bolt head
13 flange member
13a through hole
21 open end section
22 integrated flange
22a screw hole
31 first exhaust pipe
32 second exhaust pipe
33 open end section
34 expanded section
35 flange member
36 flange member
36a inner circumference groove
37 fastening nut
50 pipe joint
51 combining pipe
52 flange
52b sealing seat
53 exhaust pipe
54 ring-shaped sealing ring
54a convex surface
55 pressure connecting means
56 connecting end section

What is claimed is:

1. A pipe joint for connecting a first fluid pipeline and a second fluid pipeline hermetically, in such a manner that the relative angle therebetween can vary, comprising:

a first fluid pipeline having a connecting section;

a second fluid pipeline having a connecting section;

a ring-shaped sealing ring produced by pressure forming a fine metal wire with a fire-resistant material, comprising an inner circumference sealing surface having a conical tapered shape expanding in diameter towards an open end of the first fluid pipeline, which is provided in the connecting section of the first fluid pipeline;

an outer circumference sealing seat having a partially convex surface which is provided in the connecting section of the second fluid pipeline, in a position confronting said ring-shaped sealing ring when said first and second fluid pipelines are connected; and pressure connecting means for causing the inner circumference sealing surface of the ring-shaped sealing ring and said outer circumference sealing seat to contact each other at an area of contact, said contact being under pressure, said area of contact changing in a slidable fashion during varying of said relative angle, said contacting pressure being provided in an elastic manner in a region extending across the connecting sections of both said first and second fluid pipelines.

2. The pipe joint according to claim 1, wherein an outer circumference surface of said ring-shaped sealing ring is formed with a tapered shape expanding in diameter towards the open end of the first fluid pipeline, said ring-shaped sealing ring configured to seat inside an inner circumference groove in the connecting section of the first fluid pipeline.

3. The pipe joint according to claim 1 or claim 2, wherein said outer circumference sealing seat having a partially convex surface is a portion of the connecting section of the second fluid pipeline which has said partially convex surface.

4. The pipe joint according to claim 1 or claim 2 wherein said ring-shaped sealing ring is of a material having thermal resistance, wear resistance and corrosion resistance to exhaust products of an internal combustion engine.

5. The pipe joint according to claim 1 or 2, wherein an expanded graphite sheet is mainly used as the fire-resistant material constituting the ring-shaped sealing ring.

6. The pipe joint according to claim 3, wherein an expanded graphite sheet is mainly used as the fire-resistant material constituting the ring-shaped sealing ring.

7. The pipe joint according to claim 4, wherein an expanded graphite sheet is mainly used as the fire-resistant material constituting the ring-shaped sealing ring.

* * * * *